US012394915B2

(12) United States Patent
Kuo et al.

(10) Patent No.: US 12,394,915 B2
(45) Date of Patent: Aug. 19, 2025

(54) ANTENNA STRUCTURE AND MOBILE DEVICE

(71) Applicant: Wistron NeWeb Corp., Hsinchu (TW)

(72) Inventors: Li-Kai Kuo, Hsinchu (TW); Wen-Pin Ho, Hsinchu (TW); Cheng-Wei Chiang, Hsinchu (TW); Jia-Le Zhu, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 97 days.

(21) Appl. No.: 18/415,825

(22) Filed: Jan. 18, 2024

(65) Prior Publication Data

US 2024/0283169 A1 Aug. 22, 2024

(30) Foreign Application Priority Data

Feb. 18, 2023 (TW) ................................ 112105906

(51) Int. Cl.
*H01Q 21/30* (2006.01)
*H01Q 9/04* (2006.01)

(52) U.S. Cl.
CPC ........... *H01Q 21/30* (2013.01); *H01Q 9/0421* (2013.01)

(58) Field of Classification Search
CPC ...... H01Q 21/30; H01Q 9/0421; H01Q 5/328; H01Q 9/42; H01Q 1/243
See application file for complete search history.

(56) References Cited

U.S. PATENT DOCUMENTS

2015/0171911 A1* 6/2015 Yang ........................ H04W 4/80 455/280
2016/0065260 A1* 3/2016 Heikura ............... H04B 1/3838 455/575.5
2021/0351509 A1 11/2021 Lin et al.

FOREIGN PATENT DOCUMENTS

TW 202143554 A 11/2021

* cited by examiner

*Primary Examiner* — Dieu Hien T Duong
(74) *Attorney, Agent, or Firm* — McClure, Qualey & Rodack, LLP

(57) ABSTRACT

An antenna structure includes a ground element, a feeding radiation element, a first radiation element, a second radiation element, a shorting radiation element, a third radiation element, a filter circuit, a proximity sensor, and a tuning circuit. The ground element provides a ground voltage. The feeding radiation element has a feeding point. The first radiation element and the second radiation element are coupled to the feeding radiation element, or are disposed adjacent to the feeding radiation element. The first radiation element is also coupled through the shorting radiation element to the ground voltage. The third radiation element is disposed adjacent to the first radiation element. The third radiation element is coupled through the filter circuit to the proximity sensor. The filter circuit is also coupled through the tuning circuit to the ground voltage.

20 Claims, 5 Drawing Sheets

ANTENNA STRUCTURE AND MOBILE DEVICE

CROSS REFERENCE TO RELATED APPLICATIONS

This application claims priority of Taiwan Patent Application No. 112105906 filed on Feb. 18, 2023, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for antenna designers to design a small-size, wideband antenna element.

BRIEF SUMMARY OF THE INVENTION

In an exemplary embodiment, the invention is directed to an antenna structure that includes a ground element, a feeding radiation element, a first radiation element, a second radiation element, a shorting radiation element, a third radiation element, a filter circuit, a proximity sensor, and a tuning circuit. The ground element provides a ground voltage. The feeding radiation element has a feeding point. The first radiation element and the second radiation element are coupled to the feeding radiation element, or are disposed adjacent to the feeding radiation element. The first radiation element is also coupled through the shorting radiation element to the ground voltage. The third radiation element is disposed adjacent to the first radiation element. The third radiation element is coupled through the filter circuit to the proximity sensor. The filter circuit is also coupled through the tuning circuit to the ground voltage.

In another exemplary embodiment, the invention is directed to a mobile device that includes an upper cover housing, a display frame, a camera element, and an antenna structure as mentioned above. The antenna structure is adjacent to the camera element. The camera element and the antenna structure are disposed between the upper cover housing and the display frame.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
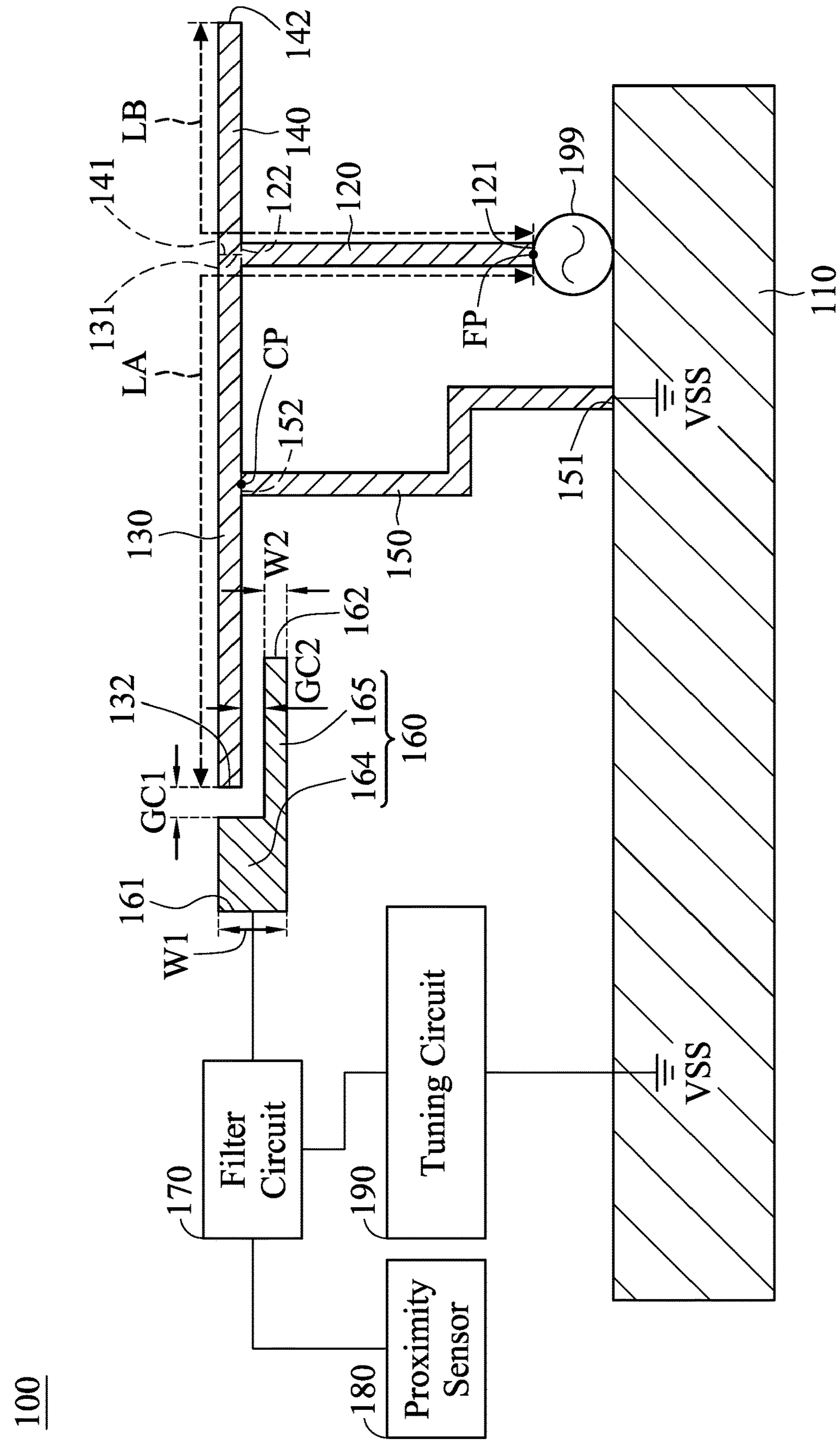
FIG. 1 is a diagram of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an antenna structure 100 according to an embodiment of the invention. The antenna structure 100 may be applied to a mobile device, such as a smart phone, a tablet computer, or a notebook computer. As shown in FIG. 1, the antenna structure 100 includes a ground element 110, a feeding radiation element 120, a first radiation element 130, a second radiation element 140, a shorting radiation element 150, a third radiation element 160, a filter circuit 170, a proximity sensor 180, and a tuning circuit 190. The ground element 110, the feeding radiation element 120, the first radiation element 130, the second radiation element 140, the shorting radiation element 150, and the third radiation element 160 may all be made of metal materials, such as copper, silver, aluminum, iron, or their alloys.

The ground element 110 is configured to provide a ground voltage VSS. For example, the ground element 110 may substantially have a rectangular shape, but it is not limited thereto. In some embodiments, the ground element 110 is implemented with a ground copper foil, which may be further coupled to a system ground plane (not shown) of the antenna structure 100.

The feeding radiation element 120 may substantially have a straight-line shape. Specifically, the feeding radiation element 120 has a first end 121 and a second end 122. A feeding point FP is positioned at the first end 121 of the feeding radiation element 120. The feeding point FP may be further coupled to a signal source 199. For example, the signal source 199 may be an RF (Radio Frequency) module for exciting the antenna structure 100.

The first radiation element 130 may substantially have a relatively long straight-line shape, which may be substantially perpendicular to the feeding radiation element 120. Specifically, the first radiation element 130 has a first end 131 and a second end 132. The first end 131 of the first radiation element 130 is coupled to the second end 122 of the feeding radiation element 120. The second end 132 of the first radiation element 130 is an open end.

The second radiation element 140 may substantially have a relatively short straight-line shape (compared with the first radiation element 130), which may also be substantially perpendicular to the feeding radiation element 120. Specifically, the second radiation element 140 has a first end 141 and a second end 142. The first end 141 of the second radiation element 140 is coupled to the second end 122 of the feeding radiation element 120, and is also coupled to the first end 131 of the first radiation element 130. The second end 142 of the second radiation element 140 is an open end. For example, the second end 132 of the first radiation element 130 and the second end 142 of the second radiation element 140 may substantially extend in opposite directions and away from each other. In some embodiments, the combination of the feeding radiation element 120, the first radiation element 130, and the second radiation element 140 substantially has a T-shape.

The shorting radiation element 150 may substantially have an N-shape. Specifically, the shorting radiation element 150 has a first end 151 and a second end 152. The first end 151 of the shorting radiation element 150 is coupled to the ground voltage VSS. The second end 152 of the shorting radiation element 150 is coupled to a connection point CP on the first radiation element 130. In other words, the first radiation element 130 is coupled through the shorting radiation element 150 to the ground voltage VSS.

The third radiation element 160 may substantially have a variable-width straight-line shape, which may be adjacent to the first radiation element 130. Specifically, the third radiation element 160 has a first end 161 and a second end 162. The first end 161 of the third radiation element 160 is coupled to the filter circuit 170. The second end 162 of the third radiation element 160 is an open end. For example, the second end 142 of the second radiation element 140 and the second end 162 of the third radiation element 160 may substantially extend in the same direction. In some embodiments, the third radiation element 160 includes a wide portion 164 adjacent to the first end 161 and a narrow portion 165 adjacent to the second end 162. The narrow portion 165 is coupled through the wide portion 164 to the filter circuit 170. In some embodiments, a first coupling gap GC1 is formed between the first radiation element 130 and the wide portion 164 of the third radiation element 160, and a second coupling gap GC2 is formed between the first radiation element 130 and the narrow portion 165 of the third radiation element 160. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The internal structures of the filter circuit 170 and the tuning circuit 190 are not limited in the invention, and they are adjustable according to different requirements. For example, each of the filter circuit 170 and the tuning circuit 190 includes one or more inductors, one or more capacitors, and one or more resistors. The third radiation element 160 is coupled through the filter circuit 170 to the proximity sensor 180. The filter circuit 170 is also coupled through the tuning circuit 190 to the ground voltage VSS. Generally, the third radiation element 160 is used as a sensing pad relative to the proximity sensor 180, and the filter circuit 170 is configured to prevent the existence of the proximity sensor 180 from negatively affecting the radiation performance of the antenna structure 100. In addition, the incorporating of the tuning circuit 190 can help to increase the operational bandwidth of the antenna structure 100.

In some embodiments, the antenna structure can cover a first frequency band, a second frequency band, a third frequency band, and a fourth frequency band. For example, the first frequency band may be from 617 MHz to 960 MHz, the second frequency band may be from 1452 MHz to 2000 MHz, the third frequency band may be from 2000 MHz to 2690 MHz, and the fourth frequency band may be from 3300 MHz to 5925 MHz. Accordingly, the antenna structure 100 can support at least the wideband operations of the next-generation 5G (5th Generation Mobile Networks) communication.

In some embodiments, the operational principles of the antenna structure 100 will be described as follows. The feeding radiation element 120 and the first radiation element 130 can be excited to generate a fundamental resonant mode, thereby forming the first frequency band. The feeding radiation element 120 and the first radiation element 130 can also be excited to generate a higher-order resonant mode, thereby forming the second frequency band. The feeding radiation element 120 and the second radiation element 140 can be excited to generate another fundamental resonant mode, thereby forming the third frequency band. The feeding radiation element 120 and the second radiation element 140 can also be excited to generate another higher-order resonant mode, thereby forming the fourth frequency band. Furthermore, the third radiation element 160 can be excited by the first radiation element 130 using a coupling mechanism. According to practical measurements, the third radiation element 160, the filter circuit 170, and the tuning circuit 190 can fine-tune the impedance matching of the first frequency band and the second frequency band, so as to effectively increase the operational bandwidths thereof.

In some embodiments, the element sizes of the antenna structure 100 will be described as follows. The total length LA of the feeding radiation element 120 and the first radiation element 130 may be shorter than 0.25 wavelength (λ/4) of the first frequency band of the antenna structure 100. The total length LB of the feeding radiation element 120 and the second radiation element 140 may be substantially equal to 0.25 wavelength (λ/4) of the third frequency band of the antenna structure 100. In the third radiation element 160, the width W1 of the wide portion 164 may be at least twice the width W2 of the narrow portion 165. The width of the first coupling gap GC1 may be wider than or equal to 3 mm. The width of the second coupling gap GC2 may be shorter than or equal to 3 mm. The above ranges of element sizes are calculated and obtained according to many experiment results, and they help to optimize the operational bandwidth and impedance matching of the antenna structure 100, and to reduce the interference between the proximity sensor 180 and other radiation elements.

The following embodiments will introduce different configurations and detailed structural features of the antenna structure 100. It should be understood that these figures and descriptions are merely exemplary, rather than limitations of the invention.

Figure 2:
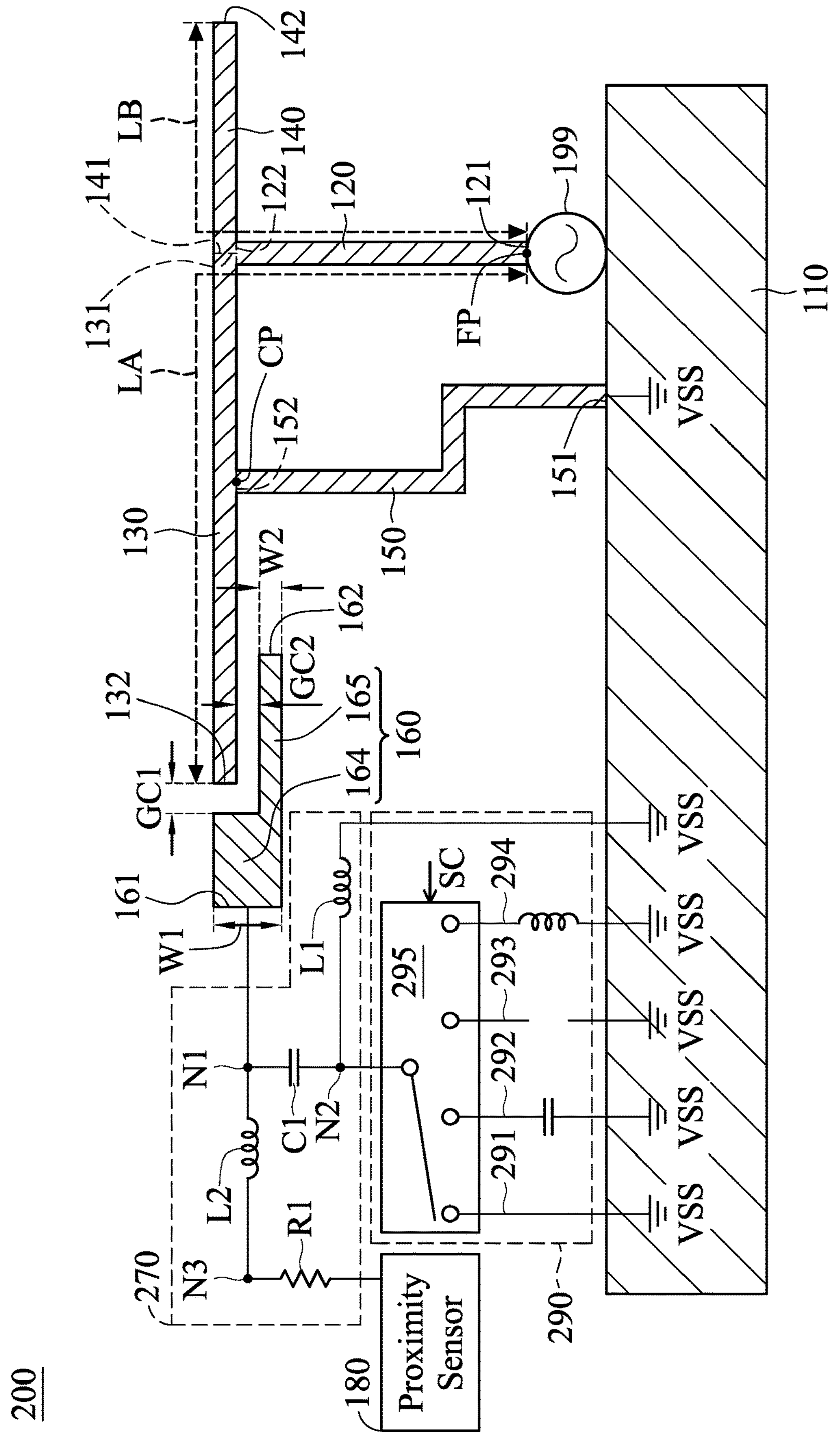
FIG. 2 is a diagram of an antenna structure according to an embodiment of the invention.

FIG. 2 is a diagram of an antenna structure 200 according to an embodiment of the invention. FIG. 2 is similar to FIG. 1. In the embodiment of FIG. 2, a filter circuit 270 of the antenna structure 200 includes a first inductor L1, a second inductor L2, a capacitor C1, and a resistor R1. Also, a tuning circuit 290 of the antenna structure 200 includes a short-circuited path 291, a capacitive path 292, an open-circuited path 293, an inductive path 294, and a switch element 295.

The capacitor C1 has a first terminal coupled to a first node N1, and a second terminal coupled to a second node N2. The first node N1 may be further coupled to the first end 161 or the wide portion 164 of the third radiation element 160. The first inductor L1 has a first terminal coupled to the second node N2, and a second terminal coupled to the ground voltage VSS. The second inductor L2 has a first terminal coupled to a third node N3, and a second terminal coupled to the first node N1. The resistor R1 has a first terminal coupled to the third node N3, and a second terminal coupled to the proximity sensor 180.

In the filter circuit 270, the first capacitor C1 can be used as a high-pass filter element, so as to prevent low-frequency noise of the proximity sensor 180 from entering the tuning circuit 290. According to practical measurements, the incorporation of the first inductor L1 can reduce the probability of the proximity sensor 180 taking error actions when the tuning circuit 290 is switched. The second inductor L2 can be used as a low-pass filter element, so as to prevent the proximity sensor 180 from negatively affecting the radiation performance of the antenna structure 200. In addition, the resistor R1 can reduce the interference between the proximity sensor 180 and other radiation elements.

The short-circuited path 291, the capacitive path 292, the open-circuited path 293, and the inductive path 294 are respectively coupled to the ground voltage VSS of the ground element 110. A terminal of the switch element 295 is coupled to the second node N2. Another terminal of the switch element 295 is switchable between the short-circuited path 291, the capacitive path 292, the open-circuited path 293, and the inductive path 294 according to a control signal SC. Thus, the second node N2 can be coupled through the path selected by the switch element 295 to the ground voltage VSS. For example, the control signal SC may be generated by a processor (not shown) according to a user input, but it is not limited thereto.

When the switch element 295 is switched between the short-circuited path 291, the capacitive path 292, the open-circuited path 293, and the inductive path 294, a grounding impedance value of the antenna structure 200 can be adjusted correspondingly. According to practical measurements, such a design can help to significantly increase the operational bandwidth of the antenna structure 200, especially for the first frequency band and the second frequency band as mentioned above.

In some embodiments, the element parameters of the antenna structure 200 will be described as follows. The inductance of the first inductor L1 may be greater than or equal to 56 nH. The inductance of the second inductor L2 may be greater than or equal to 56 nH. The capacitance of the capacitor C1 may be from 10 pF to 180 pF. The resistance of the resistor R1 may be from 0 Ω to 10 KΩ. The capacitance of the capacitive path 292 may be from 1 pF to 47 pF. The inductance of the inductive path 294 may be from 10 nH to 56 nH. The above ranges of element parameters are calculated and obtained according to many experiment results, and they help to minimize the impact of the proximity sensor 180 and to optimize the radiation performance of the antenna structure 200. Other features of the antenna structure 200 of FIG. 2 are similar to those of the antenna structure 100 of FIG. 1. Therefore, the two embodiments can achieve similar levels of performance.

Figure 3:
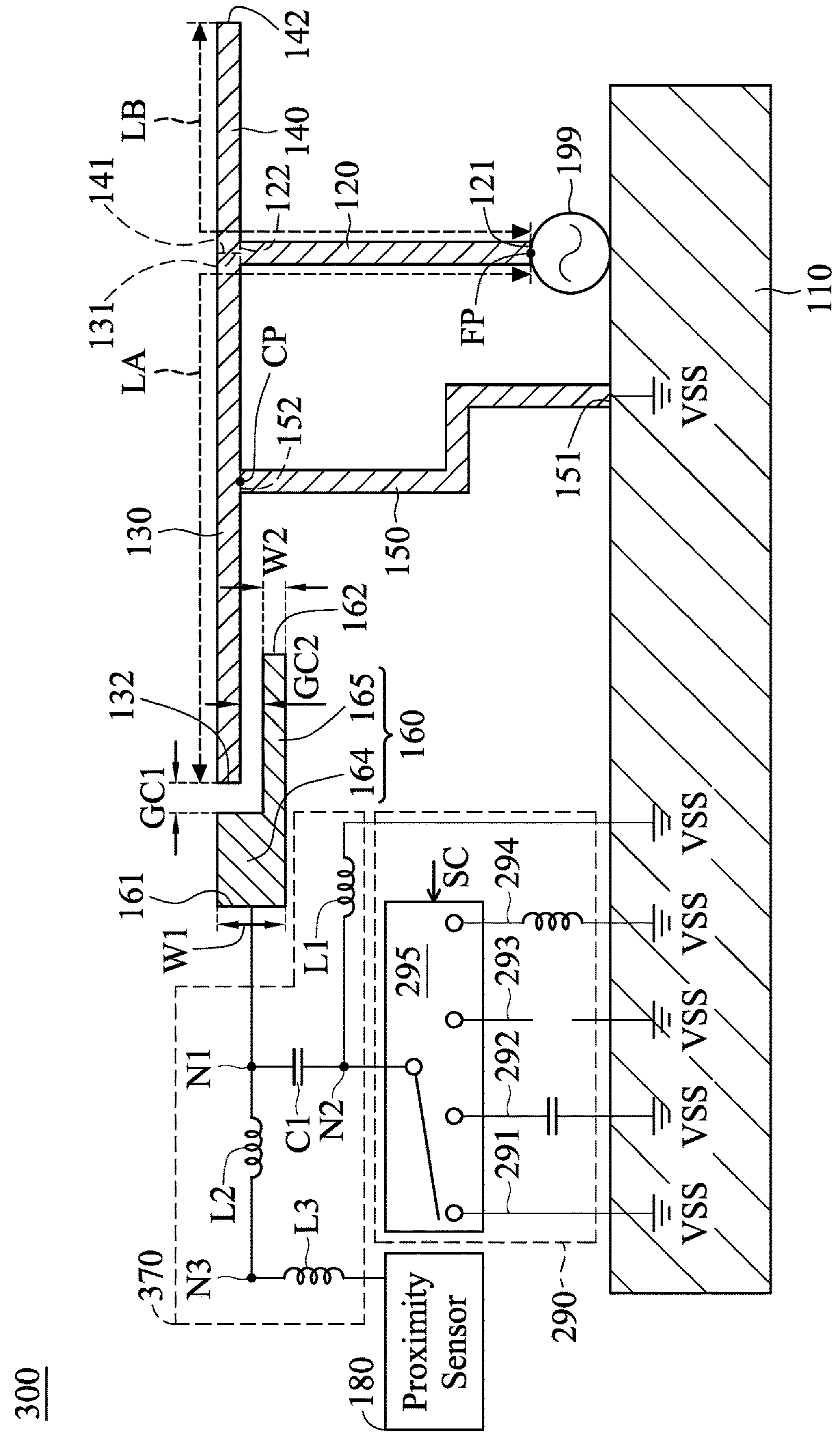
FIG. 3 is a diagram of an antenna structure according to an embodiment of the invention.

FIG. 3 is a diagram of an antenna structure 300 according to an embodiment of the invention. FIG. 3 is similar to FIG. 2. In the embodiment of FIG. 3, a filter circuit 370 of the antenna structure 300 does not include the resistor R1 as mentioned above, but further includes a third inductor L3. Specifically, the third inductor L3 has a first terminal coupled to the third node N3, and a second terminal coupled to the proximity sensor 180. For example, the inductance of the third inductor L3 may be from 10 nH to 330 nH, but it is not limited thereto. According to practical measurements, the third inductor L3 can also reduce the interference between the proximity sensor 180 and other radiation elements. Other features of the antenna structure 300 of FIG. 3 are similar to those of the antenna structure 200 of FIG. 2. Therefore, the two embodiments can achieve similar levels of performance.

Figure 4:
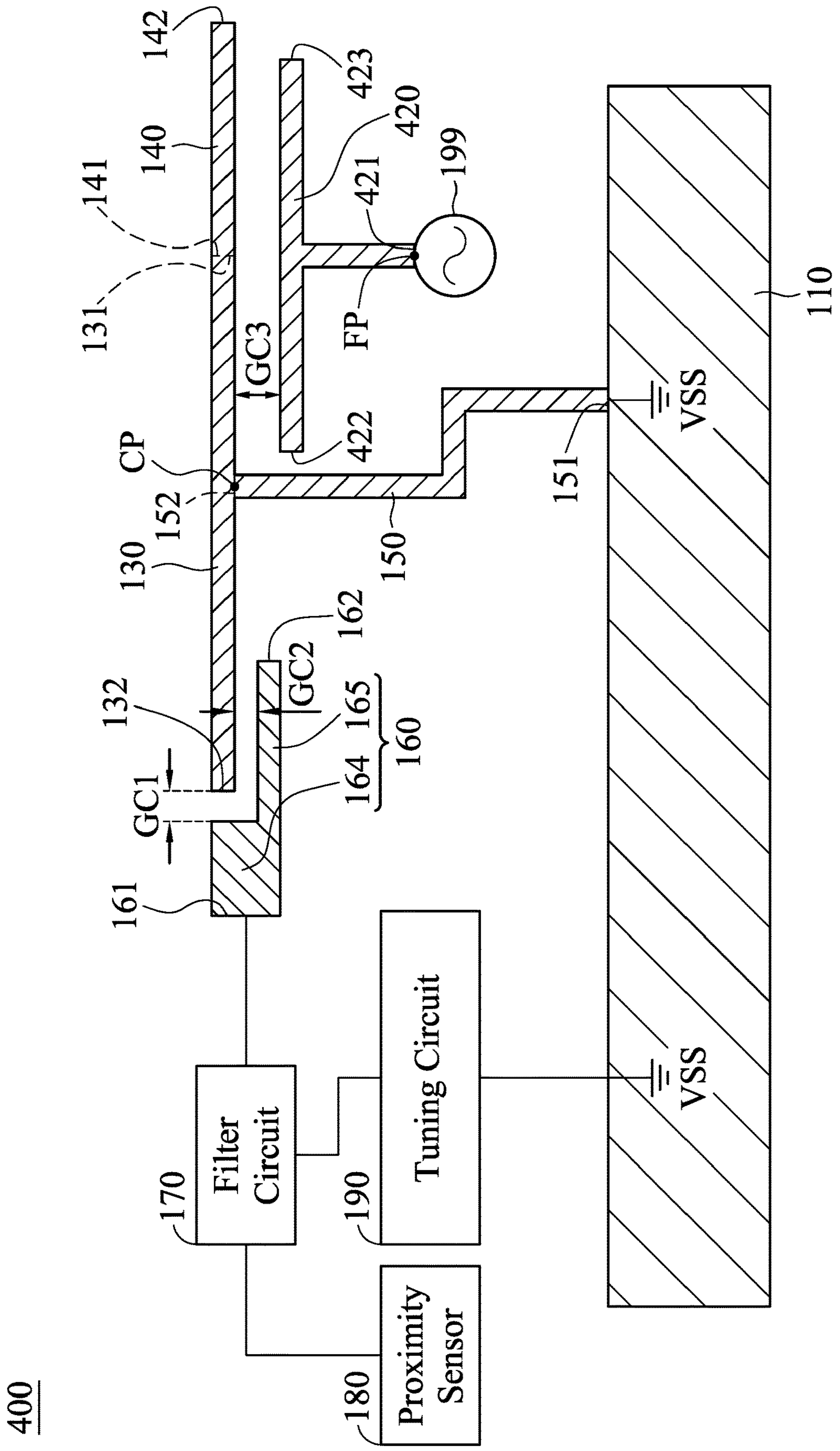
FIG. 4 is a diagram of an antenna structure according to an embodiment of the invention.

FIG. 4 is a diagram of an antenna structure 400 according to an embodiment of the invention. FIG. 4 is similar to FIG. 1. In the embodiment of FIG. 4, a feeding radiation element 420 of the antenna structure 400 substantially has a T-shape, which is adjacent to but separate from the first radiation element 130 and the second radiation element 140. Specifically, the feeding radiation element 420 has a first end 421, a second end 422, and a third end 423. The first end 421 of the feeding radiation element 420 is coupled to the feeding point FP and the signal source 199. Each of the second end 422 and the third end 423 of the feeding radiation element 420 is an open end. A third coupling gap GC3 may be formed between the feeding radiation element 420 and the first radiation element 130 or the second radiation element 140. The width of the third coupling gap GC3 may be shorter than or equal to 3 mm. According to practical measurements, the first radiation element 130 and the second radiation element 140 can be excited by the feeding radiation element 420 using a coupling mechanism, such that the antenna structure 400 can still support the wideband operations as mentioned above. Other features of the antenna structure 400 of FIG. 4 are similar to those of the antenna structure 100 of FIG. 1. Therefore, the two embodiments can achieve similar levels of performance.

Figure 5:
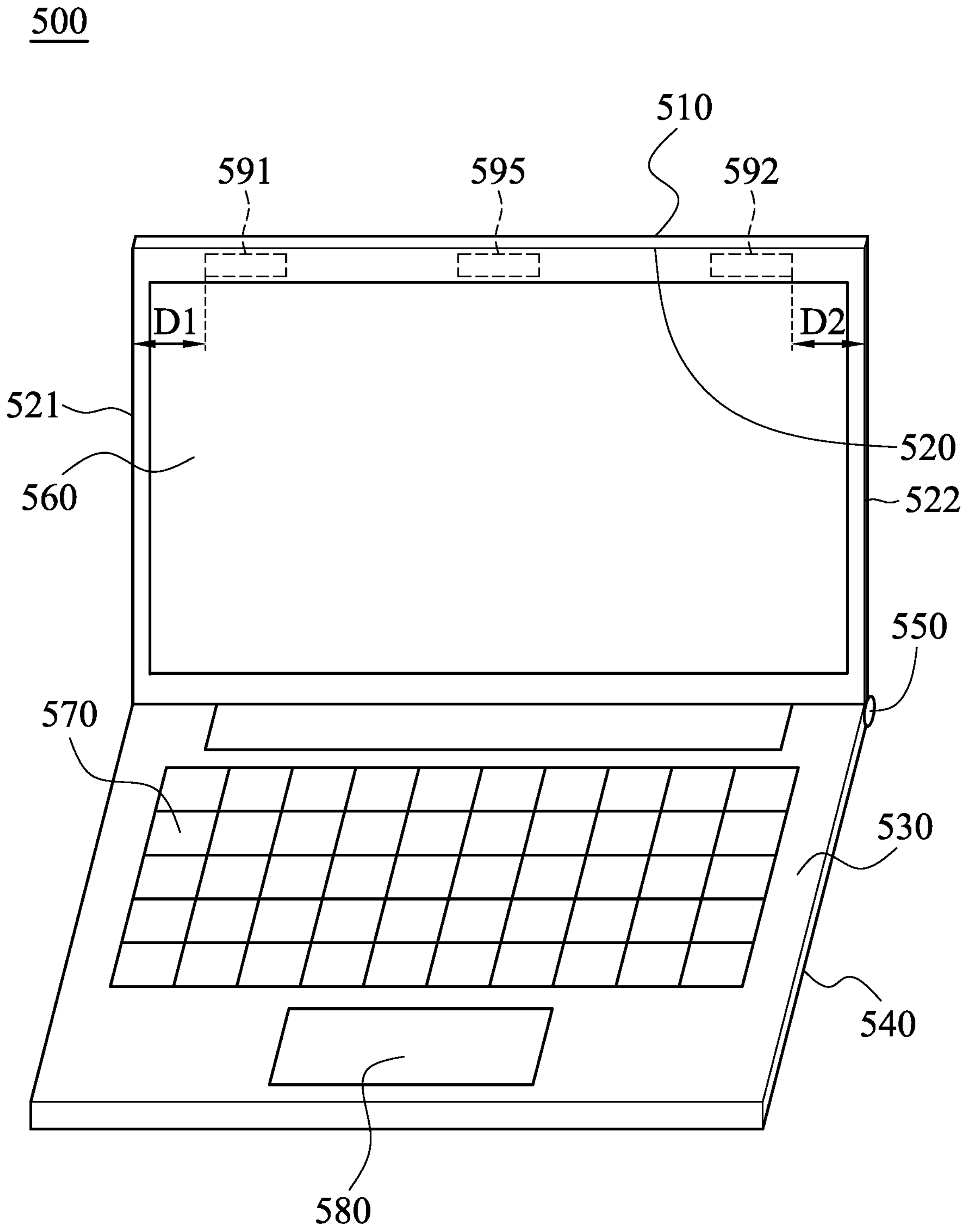
FIG. 5 is a diagram of a mobile device according to an embodiment of the invention.

FIG. 5 is a diagram of a mobile device 500 according to an embodiment of the invention. In the embodiment of FIG. 5, the aforementioned antenna structure 100 (or 200 or 300 or 400) can be applied in the mobile device 500. The mobile device 500 is a notebook computer which includes an upper cover housing 510, a display frame 520, a keyboard frame 530, and a base housing 540. It should be understood that the upper cover housing 510, the display frame 520, the keyboard frame 530, and the base housing 540 are equivalent to the so-called "A-component", "B-component", "C-component" and "D-component" in the field of notebook computers, respectively. In addition, the mobile device 500 may further include a hinge element 550, a display device 560, a keyboard 570, a touch control panel 580, and a camera element 595. The aforementioned antenna structure 100 may be disposed at a first position 591 and/or a second position 592 of the mobile device 500. Both of the antenna structure 100 and the camera element 595 are disposed between the upper cover housing 510 and the display frame 520. Furthermore, both of the first position 591 and the second position 592 are adjacent to the camera element 595 of the mobile device 500. In some embodiments, the first distance D1 between the first position 591 and the first edge 521 of the display frame 520 may be longer than or equal to 10 mm. Also, the second distance D2 between the second position 592 and the second edge 522 of the display frame 520 may be longer than or equal to 10 mm. According to practical measurements, if the first distance D1 and the second distance D2 fall within the above ranges, they can help to maintain the good communication quality provided by the antenna structure 100.

The invention proposes a novel antenna structure. In comparison to the conventional design, the invention has at least the advantages of small size, wide bandwidth, and lower manufacturing cost. Therefore, the invention is suitable for application in a variety of mobile communication devices, in particular to the devices with narrow borders.

Note that the above element sizes, element shapes, element parameters, and frequency ranges are not limitations of the invention. An antenna designer can fine-tune these settings or values in order to meet specific requirements. It should be understood that the antenna structure and the mobile device of the invention are not limited to the configurations depicted in FIGS. 1-5. The invention may merely include any one or more features of any one or more embodiments of FIGS. 1-5. In other words, not all of the features displayed in the figures should be implemented in the antenna structure and the mobile device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
- a ground element, providing a ground voltage;
- a feeding radiation element, having a feeding point;
- a first radiation element;
- a second radiation element, wherein the first radiation element and the second radiation element are coupled to the feeding radiation element or are adjacent to the feeding radiation element;
- a shorting radiation element, wherein the first radiation element is coupled through the shorting radiation element to the ground voltage;
- a third radiation element, disposed adjacent to the first radiation element;
- a filter circuit;
- a proximity sensor, wherein the third radiation element is coupled through the filter circuit to the proximity sensor; and
- a tuning circuit, wherein the filter circuit is coupled through the tuning circuit to the ground voltage.

2. The antenna structure as claimed in claim 1, wherein the feeding radiation element substantially has a straight-line shape or a T-shape.

3. The antenna structure as claimed in claim 1, wherein the first radiation element and the second radiation element substantially extend in opposite directions and away from each other.

4. The antenna structure as claimed in claim 1, wherein the shorting radiation element substantially has an N-shape.

5. The antenna structure as claimed in claim 1, wherein the third radiation element substantially has a variable-width straight-line shape.

6. The antenna structure as claimed in claim 1, wherein the third radiation element comprises a wide portion and a narrow portion, and the narrow portion is coupled through the wide portion to the filter circuit.

7. The antenna structure as claimed in claim 6, wherein a first coupling gap is formed between the first radiation element and the wide portion of the third radiation element, and a width of the first coupling gap is wider than or equal to 3 mm.

8. The antenna structure as claimed in claim 6, wherein a second coupling gap is formed between the first radiation element and the narrow portion of the third radiation element, and a width of the second coupling gap is shorter than or equal to 3 mm.

9. The antenna structure as claimed in claim 1, wherein a third coupling gap is formed between the feeding radiation element and the first radiation element or the second radiation element, and a width of the third coupling gap is shorter than or equal to 3 mm.

10. The antenna structure as claimed in claim 1, wherein the filter circuit comprises:
- a capacitor, wherein the capacitor has a first terminal coupled to a first node, and a second terminal coupled to a second node;
- wherein the first node is coupled to the third radiation element.

11. The antenna structure as claimed in claim 10, wherein the filter circuit further comprises:

a first inductor, wherein the first inductor has a first terminal coupled to the second node, and a second terminal coupled to the ground voltage.

12. The antenna structure as claimed in claim 10, wherein the filter circuit further comprises:

a second inductor, wherein the second inductor has a first terminal coupled to a third node, and a second terminal coupled to the first node.

13. The antenna structure as claimed in claim 12, wherein the filter circuit further comprises:

a resistor, wherein the resistor has a first terminal coupled to the third node, and a second terminal coupled to the proximity sensor.

14. The antenna structure as claimed in claim 12, wherein the filter circuit further comprises:

a third inductor, wherein the third inductor has a first terminal coupled to the third node, and a second terminal coupled to the proximity sensor.

15. The antenna structure as claimed in claim 10, wherein the tuning circuit comprises:

a short-circuited path, coupled to the ground voltage;

a capacitive path, coupled to the ground voltage;

an open-circuited path, coupled to the ground voltage;

an inductive path, coupled to the ground voltage; and a switch element, wherein a terminal of the switch element is coupled to the second node, and another terminal of the switch element is switchable between the short-circuited path, the capacitive path, the open-circuited path, and the inductive path according to a control signal.

16. The antenna structure as claimed in claim 1, wherein the antenna structure covers a first frequency band, a second frequency band, a third frequency band, and a fourth frequency band.

17. The antenna structure as claimed in claim 16, wherein the first frequency band is from 617 MHz to 960 MHz, the second frequency band is from 1452 MHz to 2000 MHz, the third frequency band is from 2000 MHz to 2690 MHz, and the fourth frequency band is from 3300 MHz to 5925 MHz.

18. The antenna structure as claimed in claim 16, wherein a total length of the feeding radiation element and the first radiation element is shorter than 0.25 wavelength of the first frequency band.

19. The antenna structure as claimed in claim 16, wherein a total length of the feeding radiation element and the second radiation element is substantially equal to 0.25 wavelength of the third frequency band.

20. A mobile device, comprising:

an upper cover housing;

a display frame;

a camera element; and an antenna structure as claimed in claim 1;

wherein the antenna structure is adjacent to the camera element;

wherein the camera element and the antenna structure are disposed between the upper cover housing and the display frame.

* * * * *